(12) United States Patent
Ooya

(10) Patent No.: US 7,686,867 B2
(45) Date of Patent: Mar. 30, 2010

(54) DEGASIFIER

(75) Inventor: Hajime Ooya, Osaka (JP)

(73) Assignee: Nitto Denko Corporation, Osaka (JP)

( * ) Notice: Subject to any disclaimer, the term of this patent is extended or adjusted under 35 U.S.C. 154(b) by 509 days.

(21) Appl. No.: 11/660,074

(22) PCT Filed: May 1, 2006

(86) PCT No.: PCT/JP2006/009107

§ 371 (c)(1), (2), (4) Date: Feb. 12, 2007

(87) PCT Pub. No.: WO2006/120965

PCT Pub. Date: Nov. 16, 2006

(65) Prior Publication Data

US 2007/0240569 A1    Oct. 18, 2007

(30) Foreign Application Priority Data

May 9, 2005    (JP) ............................. 2005-135957

(51) Int. Cl.
*B01D 19/00* (2006.01)
*B01D 53/22* (2006.01)

(52) U.S. Cl. .............. 96/6; 96/4; 96/8; 96/10; 96/14; 95/45; 95/46; 95/52; 95/54; 95/266; 55/495; 55/498; 55/502; 210/321.6; 210/321.79; 210/321.83

(58) Field of Classification Search ........ 96/4, 96/6, 8, 10, 14; 95/45, 46, 52, 54, 266; 55/495, 55/498, 502; 210/321.6, 321.79, 321.83
See application file for complete search history.

(56) References Cited

U.S. PATENT DOCUMENTS 4,828,587 A * 5/1989 Baurmeister et al. ............. 96/6

(Continued)

FOREIGN PATENT DOCUMENTS

| JP | 64-56803 U | * | 4/1989 |
| JP | 4-78929 U | * | 7/1992 |
| JP | 2002-253936 | | 9/2002 |

OTHER PUBLICATIONS

Microfilm of the specification and drawings annexed to the request of Japanese Utility Model Application No. 151715/1987(Laid-open No. 56803/1989) (Tokuyama Soda Co., Ltd.), Apr. 10, 1989, Fig. 1; pp. 3 to 7 (Family: none).

(Continued)

*Primary Examiner*—Jason M Greene
(74) *Attorney, Agent, or Firm*—Hamre, Schumann, Mueller & Larson, P.C.

(57) ABSTRACT

A degasifier is provided in which the deterioration in sealing property (deterioration in airtightness) is prevented while sealing members to be placed between a container and covers that compose a decompression chamber can be omitted. A degasifier includes a decompression chamber provided with a container and covers, and a gas-permeable tube. The container is a tubular body extending along the central axis. The covers seal the openings of the ends of the tubular body. The gas-permeable tube is contained in the decompression chamber in such a manner that a liquid to be degassed that has entered from the outside of the decompression chamber flows therethrough and the liquid to be degassed that has flowed therethrough flows out of the decompression chamber. The inner circumference surfaces in the vicinities of the openings of the container each are provided with a first slope that is formed to be tilted at a predetermined angle $\theta$ with respect to the central axis and to extend away from the central axis toward the opening side of the container. A portion of each of the covers that is in contact with the container is provided with a second slope that is formed to be tilted at the angle $\theta$ with respect to the central axis and to extend to approach the central axis toward the inner side of the decompression chamber, with the openings being sealed. The openings are sealed with the container and the covers being joined to each other in the state where the first slopes and the second slopes are in contact with each other, respectively.

12 Claims, 2 Drawing Sheets

U.S. PATENT DOCUMENTS

| | | | | |
|---|---|---|---|---|
| 5,404,676 | A | * | 4/1995 | Devlin .......................... 404/25 |
| 5,645,625 | A | * | 7/1997 | van Schravendijk et al. ... 95/46 |
| 6,374,609 | B1 | * | 4/2002 | Evans et al. .................... 60/532 |
| 6,494,938 | B2 | * | 12/2002 | Sims et al. ....................... 96/6 |
| 6,558,457 | B1 | * | 5/2003 | Kolczyk ...................... 96/134 |
| 6,837,992 | B2 | * | 1/2005 | Gerner et al. ..................... 96/6 |
| 7,427,312 | B2 | * | 9/2008 | Gerner et al. .................. 95/46 |
| 2001/0035093 | A1 | * | 11/2001 | Yokota ............................ 96/8 |
| 2004/0020845 | A1 | * | 2/2004 | Suzuki et al. .......... 210/500.23 |
| 2004/0035097 | A1 | * | 2/2004 | Schlensker et al. ............ 55/502 |

OTHER PUBLICATIONS

Microfilm of the specification and drawings annexed to the request of Japanese Utility Model Application No. 122295/1990(Laid-open No. 78929/1992) (Daicel Chemical Industries, Ltd.), Jul. 9, 1992, Figs. 1 to 7; pp. 8 to 19 (Family: none).

* cited by examiner

DEGASIFIER

TECHNICAL FIELD

The present invention relates to a degasifier that removes gases from a liquid.

BACKGROUND ART

A dissolved gas in a liquid may cause corrosion of tubes through which a liquid flows, decrease in heat exchanger effectiveness and pressure due to bubble generation, or uneven application of a liquid due to generated bubbles. Hence, depending on the method and purpose of using a liquid, degassing is required.

For instance, a separation membrane module (see FIG. 2) that is disclosed in JP2002-253936A (Reference 1) can be used for degassing a liquid (a liquid to be degassed). The separation membrane module 101 shown in FIG. 2 is provided with a tubular housing 102 and flanges 103 that seal the openings of the housing 102. In the separation membrane module 101, polytetrafluoroethylene (PTFE) porous tubes 109 are contained in the housing 102 as gas-permeable tubes. The respective ends of the PTFE porous tubes 109 are connected to an inlet (liquid inlet) 105 and an outlet (liquid outlet) 106 for the liquid to be degassed. In such a separation membrane module 101, a liquid to be degassed is allowed to enter from the liquid inlet 105 and to flow through the PTFE porous tubes 109, while the inside of the housing 102 is decompressed through a gas supply port 107 and/or a gas exhaust 108 formed in the housing 102. Thus the liquid can be degassed (as described in paragraph [0017] in Reference 1).

In the separation membrane module 101 disclosed in Reference 1, the housing 102 and the flanges 103 are joined to each other by a method such as welding, bonding, screwing, etc. (as described in paragraph [0018] in Reference 1). When they are joined to each other by welding, the property of sealing between the housing 102 and the flanges 103 is excellent. However, members contained in the housing 102, for example, the gas-permeable tubes may be damaged by the heat that is applied during welding. In the case of joining them to each other by bonding, an adhesive may be deteriorated by the substance that has permeated the gas-permeable tube in a gaseous state. This may cause the deterioration in the property of sealing between the housing 102 and each flange 103. In the case of joining them to each other by screwing, in order to maintain the property of sealing between the housing 102 and each flange 103, it is necessary to provide sealing members such as a seal tape, an O ring, a gland packing, etc. Furthermore, the use of a sealing member having chemical resistance to the liquid to be degassed may be required depending on the type of the above-mentioned liquid. However, suitable sealing members are unavailable or even if they are available, they are very expensive.

DISCLOSURE OF INVENTION

Hence, the present invention is intended to provide a degasifier in which a combination of a container and a cover that are joined to each other with a different configuration from the flange prevents deterioration in sealing property (deterioration in airtightness) while making it possible to omit sealing members to be placed between the container and the cover.

The degasifier of the present invention includes a decompression chamber and a gas-permeable tube. The decompression chamber is provided with a container that is a tubular body extending along the central axis and a cover that seals the opening of an end of the tubular body. The gas-permeable tube is contained in the decompression chamber in such a manner that a liquid to be degassed that has entered from the outside of the decompression chamber flows through the gas-permeable tube and flows out of the decompression chamber after flowing therethrough. In the degasifier of the present invention, the inner circumference surface in the vicinity of the opening of the container is provided with a first slope that is formed to be tilted at a predetermined angle $\theta$ with respect to the central axis and to extend away from the central axis toward the opening side of the container. Furthermore, a portion of the cover that is in contact with the container is provided with a second slope. The second slope is formed to be tilted at the above-mentioned angle $\theta$ with respect to the central axis and to extend to approach the central axis toward the inner side of the decompression chamber, with the opening being sealed. The opening is sealed, with the container and the cover being joined to each other in the state where the first slope and the second slope are in contact with each other.

According to the present invention, a degasifier is obtained that has a configuration in which using a container in which a first slope having a predetermined angle and orientation is formed in the inner circumference portion in the vicinity of the opening thereof and a cover in which a second slope having a predetermined angle and orientation is formed in a portion that is in contact with the container, the container and the cover are joined to each other, with the first and the second slopes being in contact with each other. This can prevent the degasifier from having a deteriorated sealing property (deteriorated airtightness) while making it possible to omit sealing members to be placed between the container and the cover.

DESCRIPTION OF THE INVENTION

Hereinafter, an embodiment of the present invention is described with reference to the drawings. In the following description, identical members are indicated with identical numbers and the same description may be omitted in some cases.

Figure 1:
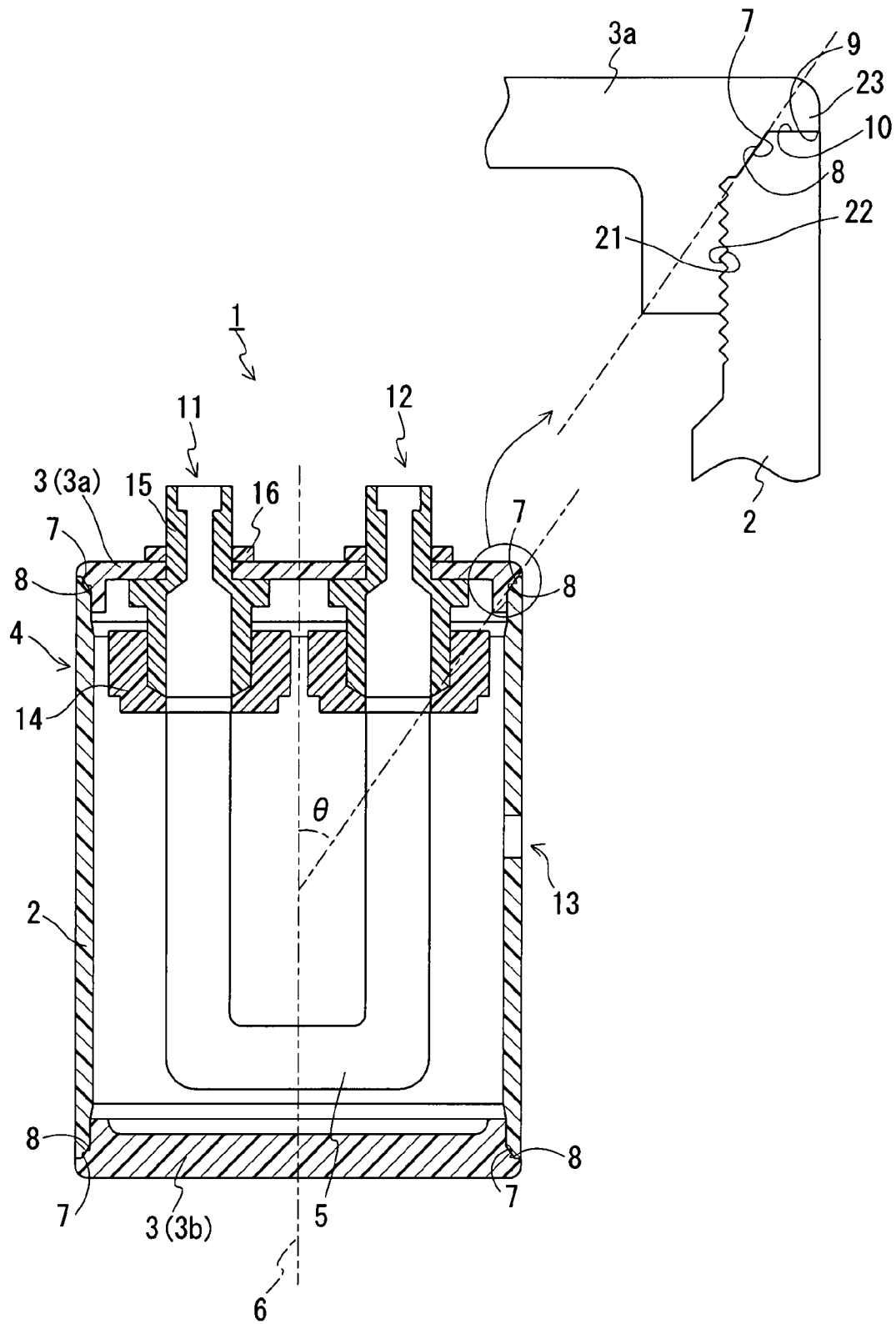
FIG. 1 is a cross-sectional view that schematically shows an example of the degasifier according to the present invention.
Figure 2:
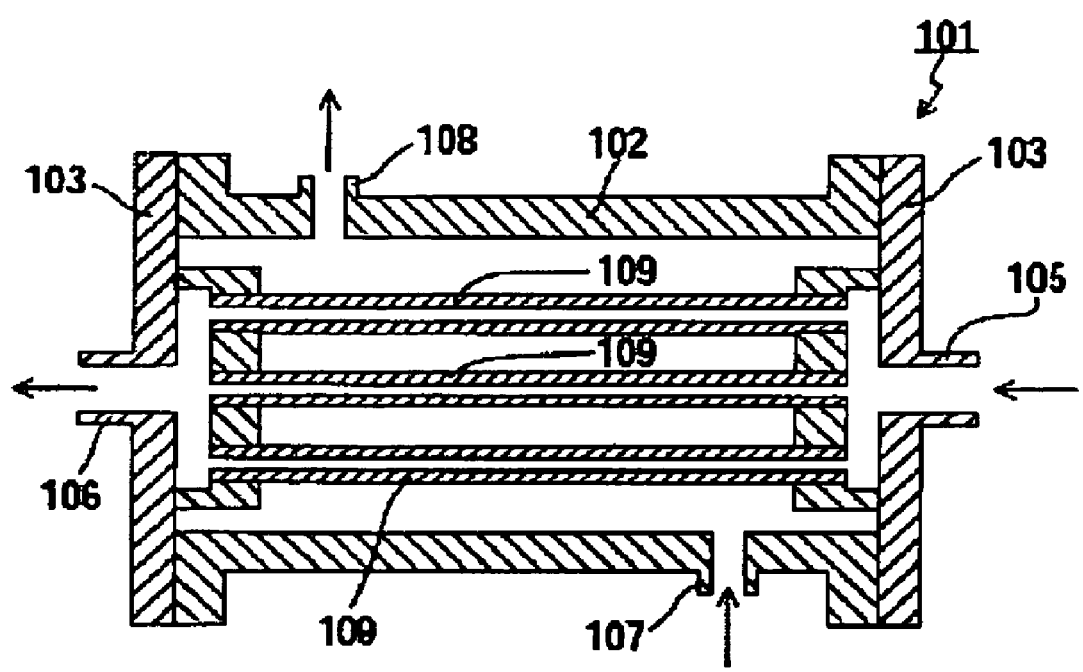
FIG. 2 is a cross-sectional view that schematically shows an example of the conventional separation membrane modules that are applicable to degasifiers.

FIG. 1 shows an example of the degasifier according to the present invention. The degasifier 1 shown in FIG. 1 includes a decompression chamber 4 and a gas-permeable tube 5 that is contained in the decompression chamber 4. The decompression chamber 4 is provided with a container 2 that is a tubular body extending along the central axis 6 and having openings at both ends thereof and covers 3 (3a and 3b) that seal the openings. The gas-permeable tube 5 is connected with an inlet 11 and an outlet 12 that are formed in the cover 3a so that a liquid to be degassed that has entered from the outside of the decompression chamber 4 flows through the gas-permeable tube 5 and the liquid that has passed therethrough flows out of the decompression chamber 4. A connection port 13 that is connected with a decompression device is formed in the container 2.

In the degasifier 1, the decompression device is connected to the connection port 13 and a liquid to be degassed is allowed to flow through the gas-permeable tube 5, with the inside of the decompression chamber 4 being decompressed to a predetermined pressure. Thus, the liquid can be degassed.

In the degasifier 1 shown in FIG. 1, the inner circumference surfaces in the vicinities of the openings of the container 2 each are provided with a first slope 7 that is formed to be tilted at a predetermined angle (incline) θ with respect to the central axis 6 and to extend away from the central axis 6 toward the opening side of the container 2. Furthermore, a second slope 8 is formed on each of the side faces of the covers 3a and 3b. The second slope 8 is formed to be tilted at the above-mentioned predetermined angle (incline) θ with respect to the central axis 6 and to extend to approach the central axis 6 toward the inner side of the decompression chamber 4, with the container 2 and the covers 3 forming the decompression chamber 4 (i.e. with the openings of the container 2 being sealed). The openings of the container 2 are sealed, with the container 2 and the covers 3 (3a and 3b) being joined to each other in the state where the first slope 7 and the second slope 8 are in contact with each other.

With such a configuration, when the inside of the decompression chamber 4 is decompressed, the covers 3 are pressed towards the inner side of the decompression chamber 4 and a force acts in the direction that allows the first slope 7 and the second slope 8 to be in closer contact with each other. Accordingly, the degasifier 1 can be obtained in which the decompression chamber 4 is prevented from having a deteriorated sealing property (deteriorated airtightness) while making it possible to omit sealing members placed between the container 2 and the covers 3.

In the degasifier 1 shown in FIG. 1, the first slopes 7 and the second slopes 8 each are a part of the side face of a circular cone whose apex angle is an angle θ. The first slopes 7 are formed to extend around the container 2 while the second slopes 8 are formed to extend around the covers 3, respectively. In the degasifier of the present invention, the first slopes 7 and the second slopes 8 each may not necessarily be a part of the side face of a circular cone. However, such a configuration makes it possible further to prevent the sealing property of the decompression chamber 4 from deteriorating.

In the degasifier 1 shown in FIG. 1, the second slopes 8 are formed in the side faces of the covers 3. However, the second slopes 8 can be formed in other portions as long as they are formed in portions of the covers 3 that are in contact with the container 2.

In the case of the degasifier of the present invention, it is not always necessary to carry out welding or bonding as in the case of the separation membrane module disclosed in Reference 1 in order to join the container 2 and the covers 3 to each other. For instance, in the degasifier 1 shown in FIG. 1, the inner circumference surfaces in the vicinities of the openings of the container 2 have a cylindrical shape and first threaded portions 21 are formed in the inner circumference surfaces, respectively. The side faces of the bodies 3 each have a cylindrical shape and second threaded portions 22 are formed in the side faces, respectively. Both the first threaded portions 21 and the second threaded portions 22 are formed in the surfaces that extend along the direction of the central axis 6, respectively. The container 2 and the covers 3 are joined to each other, with the first threaded portions 21 and the second threaded portions 22 being screwed together, respectively. In this joining method, the container 2 and the covers 3 are separated easily from each other again, which is different from the case of welding. This allows the gas-permeable tube 5 to be replaced easily, for example. In addition, the deterioration in sealing property due to the liquid to be degassed, which may be found in the case of bonding, can be prevented.

In the degasifier 1 shown in FIG. 1, the second threaded portions 22 are formed in the side faces of the covers 3, respectively. However, the second threaded portions 22 can be formed in other portions as long as they are formed in portions of the covers 3 that are in contact with the container 2.

The container 2 and the covers 3 can be joined to each other not only by being screwed together as shown in FIG. 1 but by fitting into each other or by a combination thereof. In order to join them by allowing them to fit into each other, the container 2 and the covers 3 can be configured so that fitting portions that correspond to each other can be formed, respectively, for example. The fitting portions can be formed in the same places as those where the above-mentioned first and second threaded portions are formed.

Preferably, the container 2 and the covers 3 are joined to each other through screwing since the sealing property is obtained easily and the container 2 and the covers 3 are separated more easily from each other again, for example.

The first slopes 7 can be formed in any places in the inner circumference surfaces in the vicinities of the openings of the container 2. When the first threaded portions 21 also are formed in those inner circumference surfaces, the first slopes 7 each may be formed on the opening side of the container 2 or may be formed on the opposite side to the opening side with respect to the first threaded portions 21, respectively. It is preferable that the first slopes 7 each be formed on the opening side of the container 2 with respect to the first threaded portions 21, respectively, because the sealing property of the decompression chamber 4 can be prevented further from deteriorating. This also applies to the position relationship between fitting portions and the first slopes 7 in the case of a container 2 with the fitting portions formed therein.

In the degasifier of the present invention, the container 2 and the covers 3 may have surfaces that are in contact with each other in addition to the first slopes 7 and the second slopes 8. Depending on the configuration of the above-mentioned surfaces, it is possible to further prevent the sealing property of the decompression chamber 4 from deteriorating. In the degasifier 1 shown in FIG. 1, flange portions 23 are formed in the side faces of the covers 3, respectively. Each surface 9 of the flange portions 23 and each corresponding surface 8 of the container 2 are in contact with each other.

The shape of the container 2 is not particularly limited as long as the first slopes 7 are formed. However, in order to join the container 2 and the covers 3 to each other by screwing, the portion where the first threaded portion 21 is formed in the inner circumference surfaces of the container 2 is required to have a cylindrical shape.

The shape of the outer circumference surface of the container 2 is not particularly limited. For example, it may be a cylindrical shape or a rectangular tube shape. When the outer circumference surface has a cylindrical shape, the strength of the decompression chamber 4 can be improved. On the other hand, in the case of the outer circumference surface having a rectangular tube shape, when a plurality of degasifiers 1 are to be arranged, the installation area can be smaller.

Furthermore, like the degasifier 1 shown in FIG. 1, the container 2 may have openings at both ends thereof or may have an opening at only one end thereof (in this case, the container 2 is a cylindrical body with a bottom). The container 2 having openings formed at both ends thereof can be obtained by cutting a long pipe at a predetermined length, for example. Accordingly, when the container 2 has such a configuration, the productivity of the degasifier 1 can be improved.

Generally, the angle (incline) θ can be in the range of 2° to 88°. In order further to prevent the sealing property of the decompression chamber 4 from deteriorating, the range of 5° to 80° is preferable.

The material to be used for the container 2 can be metal (particularly, stainless steel is preferable since it has excellent chemical resistance), glass, plastic, etc. Generally, fluorine resin or polyolefin is used for the plastic. Examples of fluorine resin to be used herein include polytetrafluoroethylene (PTFE), a tetrafluoroethylene-perfluoroalkyl vinyl ether copolymer (PFA), a tetrafluoroethylene-hexafluoropropylene copolymer (FEP), an ethylene-tetrafluoroethylene copolymer (ETFE), polychlorotrifluoroethylene (PCTFE), etc. For polyolefin, polyethylene (PE) or polypropylene (PP) can be used, for example. Particularly, it is preferable that the container 2 be made of polypropylene since it is inexpensive and is excellent in chemical resistance, recycling efficiency, and processability.

The shapes of the covers 3 are not particularly limited as long as they allow the openings of the container 2 to be sealed and they provide the second slopes 8 formed to be in contact with the first slopes 7, respectively.

The material to be used for the covers 3 may be the same as that to be used for the container 2.

In the degasifier 1 shown in FIG. 1, the container 2 is provided with the connection port 13 for connecting it to a decompression device. However, the covers 3 may be provided with the connection port 13.

A tube that is used generally for degasifiers may be used for the gas-permeable tube 5. Specific examples thereof include tubes made of fluorine resins such as PTFE, a tetrafluoroethylene-perfluoroalkyl vinyl ether copolymer (PFA), a tetrafluoroethylene-hexafluoropropylene copolymer (FEP), an ethylene-tetrafluoroethylene copolymer (ETFE), polychlorotrifluoroethylene (PCTFE), etc. as well as tubes made of polyolefins such as polyethylene(PE), polypropylene (PP), etc. In order to increase the membrane area per unit volume, it is preferable that the tube be made of a plurality of hollow fibers that have been gathered together. In this case, the inner diameter of one hollow fiber is generally in the range of about several tens of micrometers to several millimeters, while the number of hollow fibers that are gathered together is generally in the range of about several to several hundreds. The hollow fibers may be joined to together at the ends of the gas-permeable tube 5 with a resin having thermal adhesiveness such as fluorine resin.

A common method may be employed for connecting the gas-permeable tube 5 to the inlet 11 and the outlet 12. For instance, as shown in FIG. 1, connection members 15 may be fixed to the ends of the gas-permeable tube 5 using cap nuts 14 and then the connection members 15 to which the gas-permeable tube 5 have been fixed may be fixed to the openings of the cover 3 using nuts 16. Preferably, these members are made of fluorine resin since it is excellent in chemical resistance. The state where the gas-permeable tube 5 has been fixed to the connection members 15 may be referred to as a degassing element.

The method of containing the gas-permeable tube 5 in the decompression chamber 4 is not particularly limited, as long as the gas-permeable tube 5 is contained in such a manner that a liquid to be degassed that has entered from the outside of the decompression chamber 4 flows through the gas-permeable tube 5 and the liquid that has flowed therethrough flows out of the decompression chamber 4.

The inlet 11 and/or the outlet 12 to which the gas-permeable tube 5 is connected may be formed in the container 2.

The form in which the gas-permeable tube 5 is contained in the decompression chamber 4 is not particularly limited. However, it is preferable that it be contained in a multicoil form since this can improve the degassing capacity of the degasifier 1.

The degasifier of the present invention may include other suitable members in addition to the above-mentioned members if necessary.

EXAMPLES

Hereinafter, the present invention is described in more detail using examples. The present invention is not limited to the examples described below.

In the examples, degasifiers like the degasifier 1 shown in FIG. 1 were produced and the sealing properties thereof were evaluated.

First, the method of producing each sample that was evaluated in each example is described.

Example Sample 1

First, a cylindrical pipe (with an inner diameter of 10 cm) made of polypropylene was cut into a length of 27 cm. Then, as shown in FIG. 1, first slopes 7 and first threaded portions 21 were formed in the inner circumference surfaces in the vicinities of the openings of the pipe. Thus, a container 2 was obtained. In this process, the angle θ to be formed between a first slope 7 and the central axis 6 was set at 60° while the pitch of the first threaded portions 21 was set at 2.0 mm. Furthermore, a connection port 13 for connecting a decompression device to the container 2 was formed in the side face of the container 2.

Next, through extrusion molding and cutting of polypropylene, a pair of covers 3a and 3b having the shapes shown in FIG. 1 was formed. Each of them had a second slope 8 and a second threaded portion 22 that were formed in its side face. In one 3a of the covers, an inlet 11 and an outlet 12 were formed.

Next, the container 2 and the cover 3b that were formed as described above were screwed together in such a manner that the first slope 7 and the second slope 8 came into contact with each other. Thus, a decompression chamber 4 was formed, with one of the openings thereof having been sealed.

Subsequently, a gas-permeable tube was placed in the decompression chamber 4 formed as described above. The gas-permeable tube was formed of 125 hollow fibers (with an inner diameter of 0.95 mm, a thickness of 0.13 mm, and a length of 3.5 m) made of PTFE that were gathered together. The placement of the gas-permeable tube was carried out by spraying PFA powder on the ends of the gas-permeable tube and then heat-treating it (at 370° C. for 10 minutes), with the ends of the hollow fibers being joined together. Further, using cap nuts 14, connection members 15, and nuts 16 that were made of PTFE, the gas-permeable tube 5 was connected to the inlet 11 and the outlet 12 that had been formed in the cover 3a.

Finally, the opening of the container 2 that had not been sealed and the cover 3a were screwed together in such a manner that the first slope 7 and the second slope 8 came into contact with each other. Thus the degasifier 1 as shown in FIG. 1 was formed, which was used as Sample 1.

Example Sample 2

A degasifier 1 was formed in the same manner as in Sample 1, which was used as Sample 2. In this sample, however, the angle θ was set at 85°.

Example Sample 3

A degasifier 1 was formed in the same manner as in Sample 1, which was used as Sample 3. In this sample, however, the angle θ was set at 5°.

Comparative Example Sample

A degasifier was formed in the same manner as in Sample 1. In this sample, however, the angle θ was set at 90° and the first slopes 7 and the second slopes 8 were not formed.

The inlet 11, the outlet 12, and the connection port 13 of each degasifier sample formed as described above were connected to a vacuum pump through valves, respectively. The whole inside of the decompression chamber 4 including the inside of the gas-permeable tube 5 was decompressed to 5.3 kPa (absolute pressure). After decompression, the above-mentioned valves were closed. Then the change in pressure of the inside of the decompression chamber 4 with time was determined.

As a result, the pressure of the inside of the decompression chamber 4 five minutes after closure of the valves did not change in Example Samples 1 to 3. In Comparative Example Sample, however, the vacuum of the inside of the decompression chamber 4 decreased to 6.8 kPa (absolute pressure).

The present invention is applicable to other embodiments as long as they do not depart from the spirit or essential characteristics of the present invention. The embodiments disclosed in the present specification are to be considered in all respects as illustrative and not limiting. The scope of the present invention is indicated by the appended claims rather than by the foregoing description. All changes which come within the meaning and range of equivalency of the claims are intended to be embraced therein.

INDUSTRIAL APPLICABILITY

The present invention can provide a degasifier in which the deterioration in sealing property (deterioration in airtightness) is prevented while sealing members to be placed between the container and the covers that compose the decompression chamber can be omitted.

The invention claimed is:

1. A degasifier, comprising:
    a decompression chamber including a container and a cover, the container being a tubular body extending along a central axis, and the cover sealing an opening of an end of the tubular body; and
    a gas-permeable tube that is contained in the decompression chamber in such a manner that a liquid to be degassed that has entered from outside of the decompression chamber flows therethrough and the liquid to be degassed that has flowed therethrough flows out of the decompression chamber,
    wherein an inner circumference surface in a vicinity of the opening of the container is provided with a first slope that is formed to be tilted at a predetermined angle θ with respect to the central axis and to extend away from the central axis toward an opening side of the container,
    a portion of the cover that is in contact with the container is provided with a second slope that is formed to be tilted at the predetermined angle θ with respect to the central axis and to extend to approach the central axis toward an inner side of the decompression chamber, with the opening being sealed, and
    the opening is sealed, with the container and the cover being joined to each other in the state where the first slope and the second slope are in contact with each other.

2. The degasifier according to claim 1, wherein the first slope and the second slope are a part of a side face of a circular cone whose apex angle is the angle θ,
    the first slope is formed to extend around the container, and
    the second slope is formed to extend around the cover.

3. The degasifier according to claim 1, wherein the second slope is formed in a side face of the cover.

4. The degasifier according to claim 1, wherein the container and the cover are joined to each other by at least one method selected from fitting and screwing.

5. The degasifier according to claim 1, wherein a first threaded portion is formed in the inner circumference surface in the vicinity of the opening of the container,
    a second threaded portion is formed in a portion of the cover that is in contact with the container, and
    the container and the cover are joined to each other, with the first threaded portion and the second threaded portion being screwed together.

6. The degasifier according to claim 1, wherein the predetermined angle is in the range of 2° to 88°.

7. The degasifier according to claim 1, wherein the container and the cover have surfaces that are in contact with each other in addition to the first slope and the second slope.

8. The degasifier according to claim 1, wherein at least one selected from the container and the cover is made of at least one material selected from fluorine resin and polyolefin.

9. The degasifier according to claim 8, wherein at least one selected from the container and the cover is made of polypropylene.

10. The degasifier according to claim 1, wherein the gas-permeable tube is made of fluorine resin.

11. The degasifier according to claim 10, wherein the fluorine resin is polytetrafluoroethylene.

12. The degasifier according to claim 5, wherein the first slope is formed on the opening side of the container with respect to the first threaded portion and the second slope is formed on the opening side of the container with respect to the second threaded portion.

* * * * *